United States Patent
Ramesh et al.

(10) Patent No.: US 12,137,279 B2
(45) Date of Patent: *Nov. 5, 2024

(54) METHODS AND SYSTEMS FOR DETERMINING CREATION ATTRIBUTES OF VIDEO CONTENT

(71) Applicant: Roku, Inc., San Jose, CA (US)

(72) Inventors: Sunil Ramesh, Cupertino, CA (US); Michael Cutter, Golden, CO (US); Charles Brian Pinkerton, Boulder, CO (US); Karina Levitian, Austin, TX (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/480,680

(22) Filed: Oct. 4, 2023

(65) Prior Publication Data

US 2024/0187709 A1 Jun. 6, 2024

Related U.S. Application Data

(63) Continuation of application No. 18/061,076, filed on Dec. 2, 2022, now Pat. No. 11,818,443.

(51) Int. Cl.
*H04N 21/8358* (2011.01)
*H04N 21/431* (2011.01)
*H04N 21/84* (2011.01)

(52) U.S. Cl.
CPC ..... *H04N 21/8358* (2013.01); *H04N 21/4312* (2013.01); *H04N 21/84* (2013.01)

(58) Field of Classification Search
CPC . H04N 21/8358; H04N 21/4312; H04N 21/84
See application file for complete search history.

(56) References Cited

U.S. PATENT DOCUMENTS

| 10,643,320 B2 | 5/2020 | Lee | |
|---|---|---|---|
| 11,695,975 B1* | 7/2023 | Giraud | G06V 40/40 725/25 |

(Continued)

FOREIGN PATENT DOCUMENTS

| KR | 20140091081 A | 9/2014 |
|---|---|---|
| WO | 2019229519 A1 | 12/2019 |
| WO | 2020163508 A1 | 8/2020 |

OTHER PUBLICATIONS

Alattar et al., "A System for Mitigating the Problem of Deepfake News Videos Using Watermarking", Electronic Imaging, 32(4):117-1 (2020).

*Primary Examiner* — Fernando Alcon
(74) *Attorney, Agent, or Firm* — McDonnell Boehnen Hulbert & Berghoff LLP (57) ABSTRACT

In one aspect, an example method includes (i) receiving, from a content-distribution system, video comprising a watermark; (ii) extracting the watermark from the video; (iii) based on the extracted watermark, determining a content-creation attribute of the video that indicates a process by which the video was created, wherein the determining comprises using the watermark to select the content-creation attribute from among a set of two or more content-creation attributes comprising organically-generated video and synthetically-generated video; and (iv) in response to determining the content-creation attribute of the video, causing a content-presentation device to perform an action.

20 Claims, 4 Drawing Sheets

(56) References Cited

U.S. PATENT DOCUMENTS

| | | | |
|---|---|---|---|
| 11,704,398 B1* | 7/2023 | Tougas | G06F 21/36 |
| | | | 726/9 |
| 11,922,532 B2* | 3/2024 | Alattar | G06F 21/16 |
| 2008/0002854 A1 | 1/2008 | Tehranchi | |
| 2008/0307454 A1 | 12/2008 | Ahanger | |
| 2020/0267404 A1 | 8/2020 | Levy | |
| 2020/0275166 A1 | 8/2020 | Jordan | |
| 2021/0012450 A1 | 1/2021 | Malvar | |
| 2021/0233204 A1 | 7/2021 | Alattar | |
| 2021/0357533 A1* | 11/2021 | Britton | G06T 7/90 |
| 2021/0409734 A1 | 12/2021 | Petajan | |
| 2022/0036495 A1 | 2/2022 | Reed | |
| 2022/0286491 A1 | 9/2022 | White | |
| 2022/0374105 A1 | 11/2022 | Seth | |
| 2023/0031472 A1 | 2/2023 | Deshpande | |
| 2023/0344639 A1* | 10/2023 | Hojjati | H04L 9/3213 |
| 2024/0087297 A1* | 3/2024 | Shellhorn | G06V 10/774 |
| 2024/0096051 A1* | 3/2024 | Gopalakrishna | G10L 17/26 |

* cited by examiner

METHODS AND SYSTEMS FOR DETERMINING CREATION ATTRIBUTES OF VIDEO CONTENT

PRIORITY

This disclosure is a continuation of, and claims priority to, U.S. patent application Ser. No. 18/061,076 filed Dec. 2, 2022, which is hereby incorporated by reference herein in its entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example computing system is described. The computing system is configured for performing a set of acts including (i) receiving, from a content-distribution system, video comprising a watermark; (ii) extracting the watermark from the video; (iii) based on the extracted watermark, determining a content-creation attribute of the video that indicates a process by which the video was created, where the determining comprises using the watermark to select the content-creation attribute from among a set of two or more content-creation attributes comprising organically-generated video and synthetically-generated video; and (iv) in response to determining the content-creation attribute of the video, causing a content-presentation device to perform an action.

In another aspect, an example method is described. The method includes (i) receiving, from a content-distribution system, video comprising a watermark; (ii) extracting the watermark from the video; (iii) based on the extracted watermark, determining a content-creation attribute of the video that indicates a process by which the video was created, where the determining comprises using the watermark to select the content-creation attribute from among a set of two or more content-creation attributes comprising organically-generated video and synthetically-generated video; and (iv) in response to determining the content-creation attribute of the video, causing a content-presentation device to perform an action.

In another aspect, a non-transitory computer-readable medium is described. The non-transitory computer-readable medium has stored thereon program instructions that upon execution by a computing system, cause performance of a set of acts. The set of acts includes (i) receiving, from a content-distribution system, video comprising a watermark; (ii) extracting the watermark from the video; (iii) based on the extracted watermark, determining a content-creation attribute of the video that indicates a process by which the video was created, where the determining comprises using the watermark to select the content-creation attribute from among a set of two or more content-creation attributes comprising organically-generated video and synthetically-generated video; and (iv) in response to determining the content-creation attribute of the video, causing a content-presentation device to perform an action.

DETAILED DESCRIPTION

I. Overview

To deliver and present content (e.g., video) to end-users, a content provider can transmit the content to one or more content-distribution systems, each of which can in turn transmit the content to one or more respective content-presentation devices to be output for presentation to respective end-users. Such a hierarchical arrangement can facilitate convenient, widespread distribution of content.

Modern content-presentation devices, such as content-presentation devices in the homes or other premises of end-users, are increasingly equipped with functions aimed to improve user experience. These content-presentation devices may range from smart televisions to set-top boxes to video game consoles.

With the increased use of artificial intelligence technologies in media, one area in which user experience improvements are desired is content origin—namely, how content was created. For example, users are often unable to differentiate between video that is organically generated and video that is synthetically generated.

Accordingly, disclosed herein are methods and systems for determining creation attributes of video content—also referred to herein as "content-creation attributes." In an example method, a computing system receives, from a content-distribution system, video including a watermark and extracts the watermark from the video. Based on the extracted watermark, the computing system determines a content-creation attribute of the video that indicates a process by which the video was created, by using the watermark to select the content-creation attribute from among a set of two or more content-creation attributes comprising organically-generated video and synthetically-generated video. In other words, the content-creation attribute can indicate whether the video was organically generated or synthetically generated.

Herein, organic generation of a video refers to the video having been at least partially captured by traditional means, such as a camera. This can include, for example, live video (e.g., live sporting events) and pre-recorded video (e.g., advertisements, episodes of a TV show, movies). In some cases, an organically-generated video can include a degree of synthetic elements without that video being categorized as synthetically generated. For example, movies that are often shot with cameras in the production phase include computer imagery, created manually or using artificial intelligence that is added in post-production.

In contrast to organically-generated video, synthetic generation of a video refers to the video predominantly or entirely being comprised of images, actors, speech, text, music, and/or other elements that are artificially created by a computer using artificial intelligence, such as machine learning (e.g., neural networks). Within examples, synthetically-generated video does not include any video that is shot with a camera. As a specific example comparison, a traditional news broadcast can be shot with a camera and can include a reporter sitting behind a desk, being filmed as they present the news. Whereas, a synthetically-generated news broadcast can include a fake actor whose appearance, mannerisms, lip movements, etc. are all synthetically created using artificial neural networks and deep learning, and who speaks based on a text file having sentences that are written by a human operator or that are generated using neural networks.

Thus, a content-creation attribute can indicate that the received video is organically-generated, or can indicate that the received video is synthetically-generated. In some cases, a content-creation attribute might indicate a hybrid of the two processes. For example, the content-creation attribute can classify the video as organically-generated video, synthetically-generated video, or a hybrid of organically generated and synthetically generated.

As a more specific example, a hybrid video can be a video that has organic elements, but that includes temporal or spatial portions that are entirely synthetically generated, such as a region of a frame in which a live actor is present but surrounded by a crowd of synthetically-generated humans, or a fifteen-minute segment of a movie in which no live actors are present and, rather, the actors, backgrounds, and music are all generated using neural networks. Other examples are possible as well.

In response to determining the content-creation attribute of the video, the computing system causes a content-presentation device to perform an action, such as displaying information that indicates the content-creation attribute of the video, so as to inform the user.

Various other features of these systems and methods are described hereinafter with reference to the accompanying figures.

II. Example Architecture

Figure 1:
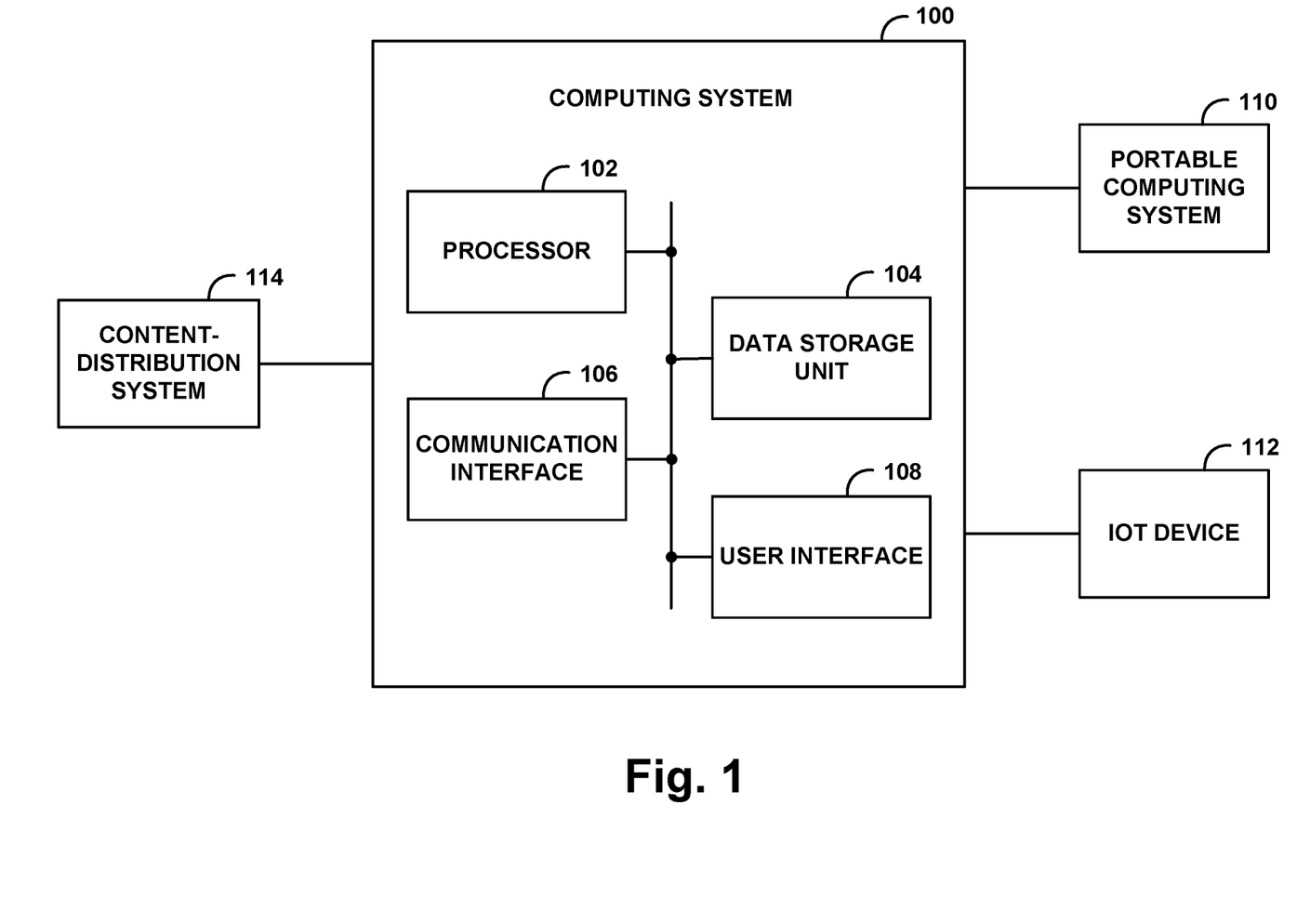
FIG. 1 is a simplified block diagram of an example computing system in which various described principles can be implemented.

FIG. 1 is a simplified block diagram of an example computing system 100. The computing system 100 can be configured to perform and/or can perform one or more operations, such as the operations described in this disclosure. The computing system 100 can include various components, such as a processor 102, a data-storage unit 104, a communication interface 106, and/or a user interface 108.

The processor 102 can be or include a general-purpose processor (e.g., a microprocessor) and/or a special-purpose processor (e.g., a digital signal processor). The processor 102 can execute program instructions included in the data-storage unit 104 as described below.

The data-storage unit 104 can be or include one or more volatile, non-volatile, removable, and/or non-removable storage components, such as magnetic, optical, and/or flash storage, and/or can be integrated in whole or in part with the processor 102. Further, the data-storage unit 104 can be or include a non-transitory computer-readable storage medium, having stored thereon program instructions (e.g., compiled or non-compiled program logic and/or machine code) that, upon execution by the processor 102, cause the computing system 100 and/or another computing system to perform one or more operations, such as the operations described in this disclosure. These program instructions can define, and/or be part of, a discrete software application.

In some instances, the computing system 100 can execute program instructions in response to receiving an input, such as an input received via the communication interface 106 and/or the user interface 108. The data-storage unit 104 can also store other data, such as any of the data described in this disclosure.

The communication interface 106 can allow the computing system 100 to connect with and/or communicate with another entity according to one or more protocols. Therefore, the computing system 100 can transmit data to, and/or receive data from, one or more other entities according to one or more protocols. In one example, the communication interface 106 can be or include a wired interface, such as an Ethernet interface or a High-Definition Multimedia Interface (HDMI). In another example, the communication interface 106 can be or include a wireless interface, such as a cellular or WI-FI interface.

The user interface 108 can allow for interaction between the computing system 100 and a user of the computing system 100. As such, the user interface 108 can be or include an input component such as a keyboard, a mouse, a remote controller, a microphone, and/or a touch-sensitive panel. The user interface 108 can also be or include an output component such as a display device (which, for example, can be combined with a touch-sensitive panel) and/or a sound speaker.

The computing system 100 can also include one or more connection mechanisms that connect various components within the computing system 100 and that connect the computing system 100 to other devices. For example, the computing system 100 can include the connection mechanisms represented by lines that connect components of the computing system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The computing system 100 can include one or more of the above-described components and can be configured or arranged in various ways. For example, the computing system 100 can be configured as a server and/or a client (or perhaps a cluster of servers and/or a cluster of clients) operating in one or more server-client type arrangements, for instance.

As further shown, the computing system 100 can be coupled to a portable computing system 110 and an Internet of Things (IOT) device 112.

The portable computing system 110 can be or include a laptop computer, smartphone, tablet computer, wearable computing device (e.g., a smartwatch or other form factor that can be worn by a user), and/or other computing system capable of being easily moved. In some cases, a personal desktop computer can be considered a portable computing system. The portable computing system 110 can include one or more of the above-described components of the computing system 100 (e.g., a processor, data storage unit, communication interface, and user interface) and/or can include various other components such as a light source, a display device, and/or a speaker. In some cases, the portable computing system 110 can be considered an IoT device.

The IoT device 112 can take the form of a computing system, such as a "smart home" device such as a connected appliance, utility, light, switch, power outlet, or speaker. The IoT device 112 can include one or more of the above-described components of the computing system 100 (e.g., a processor, data storage unit, communication interface, and user interface) and/or can include various other components such as any of those described above. The IoT device 112 can communicate with other IoT devices or any other computing system described herein and share data over an IoT network, such as a local area network (LAN) or other type of computer network.

As further shown, the computing system 100 also communicates with a content-distribution system 114. For example, the content-distribution system 114 can transmit video (e.g., that it received from a content provider) to the computing system 100. In some cases, the video can take the form of a linear sequence of video segments (e.g., program segments and advertisement segments) or a portion thereof (e.g., one or more frames of a given video segment).

The content-distribution system 114 can transmit content on one or more channels (sometimes referred to as stations or feeds). As such, the content-distribution system 114 can be associated with a single channel content distributor or a multi-channel content distributor such as a multi-channel video program distributor (MVPD).

The content-distribution system 114 and its means of transmission of content on the channel to the computing system 100 can take various forms. By way of example, the content-distribution system 114 can be or include a cable-television head-end that is associated with a cable-television provider and that transmits the content on the channel to the computing system 100 through hybrid fiber/coaxial cable connections. As another example, the content-distribution system 114 can be or include a satellite-television head-end that is associated with a satellite-television provider and that transmits the content on the channel to the computing system 100 through a satellite transmission. As yet another example, the content-distribution system 114 can be or include a television-broadcast station that is associated with a television-broadcast provider and that transmits the content on the channel through a terrestrial over-the-air interface to the computing system 100. As yet another example, the content-distribution system 114 can be or include a streaming server configured to provide on-demand streaming video. In these and other examples, the content-distribution system 114 can transmit the content in the form of an analog or digital broadcast stream representing the content.

In some cases, the computing system 100 can take the form of a controller of a content-presentation device configured to provide video for display to a user in a viewing environment of the content-presentation device. The controller can be located in the content-presentation device itself—that is, the computing system 100 can be a controller that is onboard the content-presentation device (e.g., the content-presentation device's local controller, housed within a physical housing of the content-presentation device)—or can be located remote from, but communicatively coupled to, the content-presentation device.

Herein, a "viewing environment" can refer to an environment, such as a room of a house, within which end-users can view media content that is provided for display by the content-presentation device. The content-presentation device can be or include a television set, a set-top box, a television set with an integrated set-top box, a video game console, a desktop computer, a laptop computer, a tablet computer, a mobile phone, a speaker (e.g., a soundbar mounted below the television set), or a home appliance, among other possibilities.

Although not explicitly shown in FIG. 1, any two or more of the portable computing system 110, the IoT device 112, and the content-distribution system can be connected by a connection mechanism and can share data with each other.

III. Example Operations

The computing system 100 and/or components thereof can be configured to perform and/or can perform one or more operations. Examples of these operations and related features will now be described with reference to FIGS. 2, 3, 4, and 5.

Figure 2:
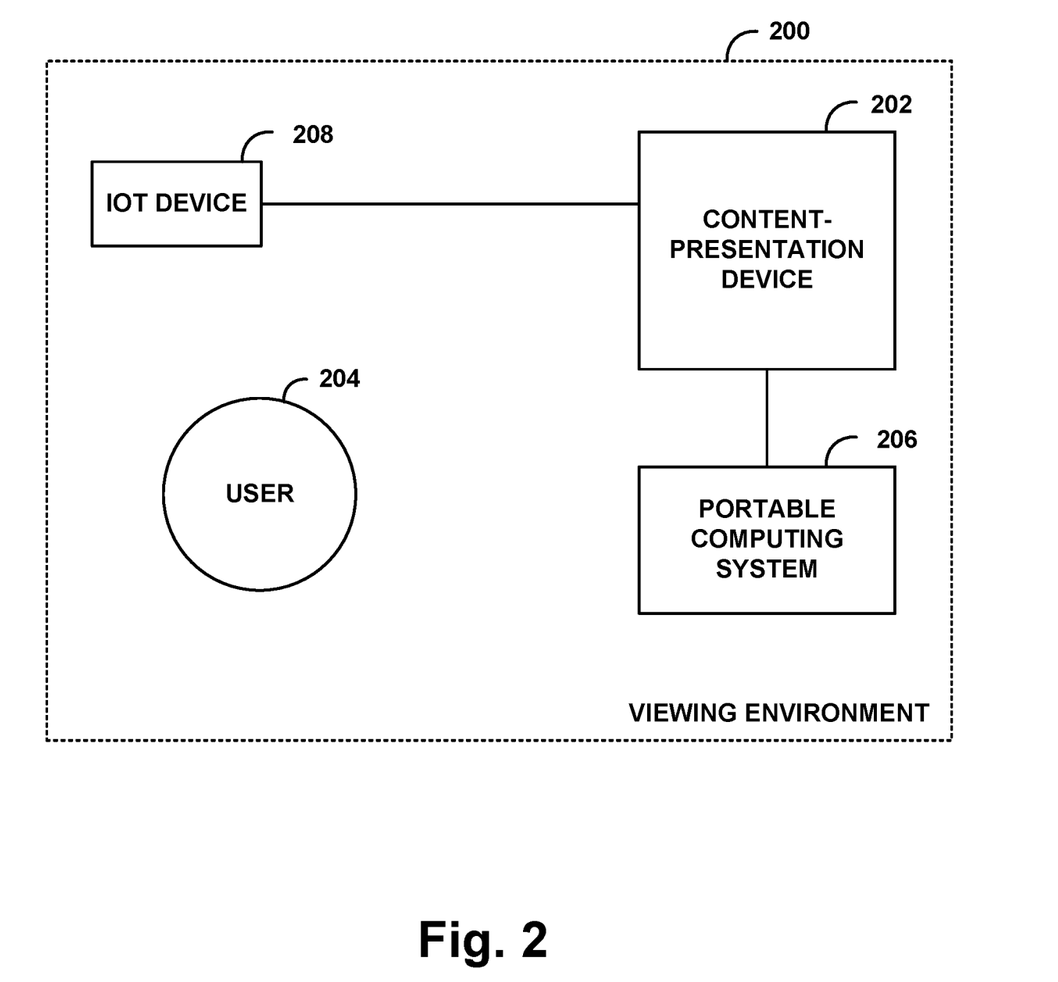
FIG. 2 depicts an example viewing environment of a content-presentation device.

FIG. 2 depicts an example viewing environment 200 of a content-presentation device 202. The content-presentation device 202 can be a computing system such as computing system 100. Thus, the disclosed operations can be performed by the content-presentation device 202. However, it should be understood that a computing system other than the content-presentation device 202 can be configured to perform any one or more of the operations described herein.

As further shown, a user 204 is present in the viewing environment 200 (e.g., a user watching television) and the content-presentation device 202 is communicatively coupled to a portable computing system 206 and an IoT device 208. The portable computing system 206 can take any of the forms described above with respect to portable computing system 110, and the IoT device 208 can take any of the forms described above with respect to IoT device 112.

In operation, the computing system 100 receives video from a content-distribution system (e.g., content-distribution system 114) and extracts a watermark from the video. The watermark is digital and can take various forms, such as an invisible stenographic watermark. In other examples, the watermark can be visible in the video.

The watermark can include metadata. Metadata can be added to the watermark, after which the watermark can be encrypted and then embedded into the video. The metadata can include, for example, audio fingerprints, video fingerprints, and/or other watermarks. In practice, the watermark can be embedded into the video by a content creator that created the video, or by another entity, such as a content distributor that controls the content-distribution system.

The metadata can also include metadata that designates a content-creation attribute of the video, where the content-creation attribute is data that indicates a process by which the video was created, as discussed above. As an example, the content-creation attribute can indicate whether the video was organically generated or synthetically generated.

Based on the extracted watermark, the computing system 100 determines a content-creation attribute of the video. The computing system 100 can decrypt the extracted watermark to determine the content-creation attribute designated by the metadata.

More particularly, the computing system 100 uses the watermark to select the content-creation attribute from among a set of two or more content-creation attributes. In line with the discussion above, the set of content-creation attributes includes organically-generated video and synthetically-generated video. In some cases, the set of content-creation attributes can additionally include a hybrid video as discussed above. And in some cases, such as when the watermark does not include metadata that designates a content-creation attribute of the video, the set of content-creation attributes can include video of unknown origin (i.e., it is not known whether the video is organically generated, synthetically generated, or a hybrid). Within other examples, more or less content-creation attributes are possible as well.

In some cases, the metadata can include a value and the computing system 100 can be configured to determine the content-creation attribute based on that value. For example, a value of zero can designate the video as organically-generated, a value of one can designate the video as synthetically generated, and a value of two can designate the video as a hybrid. If no such value is found, the computing system 100 can responsively determine the content-creation attribute to be a video of unknown origin.

In response to determining the content-creation attribute of the video, the computing system 100 causes the content-presentation device 202 to perform an action. For example, the computing system 100 can transmit instructions to the content-presentation device 202 that, upon receipt by the content-presentation device 202, cause the content-presentation device 202 to perform the action. The computing system 100 can be a control system that is part of the content-presentation device 202 itself (e.g., the content-presentation device's local processor(s), memory, and interfaces) or can be located remote from the content-presentation device 202.

To select the action based on the determined content-creation attribute of the video, the computing system 100 can have stored in memory (e.g., data-storage unit 104) mapping data that maps each content-creation attribute of the set of content-creation attributes to a corresponding one of a plurality of actions (or a corresponding set of multiple actions). The computing system 100 can thus use this mapping data to select an action (or set of multiple actions) that the mapping data maps to the content-creation attribute that is either designated by the metadata of the extracted watermark or determined by the computing system 100 based on a lack of such metadata (e.g., a video of unknown origin).

As an example, the action can involve preventing any portion of the video from being displayed. This may be desirable in situations where the user 204 does not want to view certain types of content. For instance, the user 204 might not want to view synthetically-generated content. To facilitate this, the computing system 100 can be configured to, by default or in response to received user input, block synthetically-generated videos from being displayed. As a specific example, the user 204 can create or alter a control setting (e.g., parental controls) on the content-presentation device 202 that prevents synthetically-generated videos from being displayed by configuring the mapping data to map synthetically-generated video (e.g., data representative thereof, such as a value) to a responsive action of preventing any portion of the video from being displayed. Thus, as the computing system 100 receives the video, the computing system 100 can identify the video as synthetically generated, and responsively prevent that video from being displayed.

As another example, the action can involve displaying information identifying the content-creation attribute, thus informing the user 204. In operation, the computing system 100 can determine the content-creation attribute while processing the video in real time or, in some cases, can determine the content-creation attribute before the video is presented (if the video is available for processing before presentation). Thus, the information can be displayed while presenting the video or, if the video is received (e.g., downloaded) in full or in part before any portion of the video has been presented, the information can be displayed before presenting the video.

The information that identifies the content-creation attribute can take various forms. For example, the information can be or include a color, and the computing system 100 can select the color using mapping data that maps each content-creation attribute of the set of content-creation attributes to a corresponding one of a plurality of distinct colors. For instance, the mapping data can map the color red to synthetically-generated video, the color yellow to video of unknown origin, the color blue to hybrid vide, and the color green to organically-generated video.

As another example, the information can be or include a colored border enclosing the video, and the computing system 100 can select the color using mapping data that maps each content-creation attribute of the set of content-creation attributes to a corresponding one of a plurality of distinct colors for the border.

Figure 3:
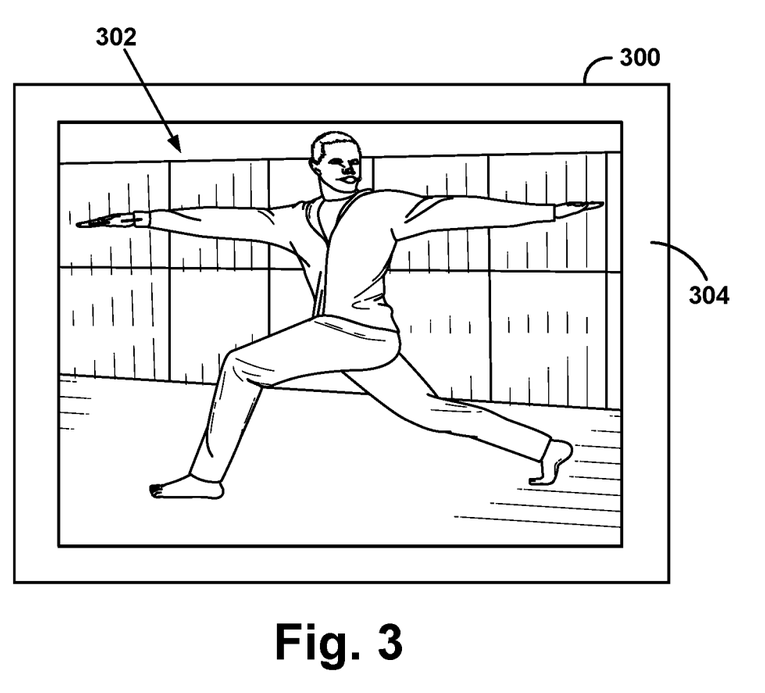
FIG. 3 depicts an example user interface in which video is presented along with information identifying that the video is organically-generated.

FIG. 3 depicts an example user interface 300 in which video 302 is presented along with information identifying that the video 302 is organically-generated—namely, a border 304 enclosing the video 302 and having a specific color corresponding to the content-creation attribute of the video 302. For instance, the border 304 can be green. If the content-creation attribute of the video 302 differs for different temporal portions (e.g., the first twenty minutes being organically-generated and the next twenty minutes being a hybrid), the color of the border 304 can change in real time while the video is being presented.

As yet another example, the information can be or include a pop-up window or object overlaid over video content being presented (e.g., the received video or different video). As a specific example, a pop-up object can be a particular shape having a particular color (e.g., a solid circle having a particular color, overlaid over the underlying content in the top-right corner of the display). As another specific example, a pop-up window can appear in the center of the display or a corner of the display and have text identifying the content-creation attribute.

Figure 4:
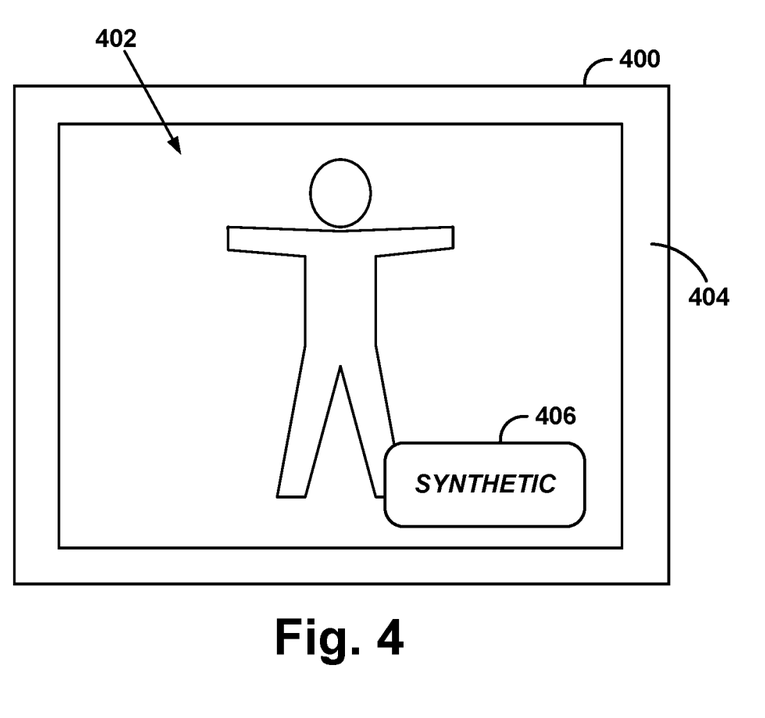
FIG. 4 depicts an example user interface in which video is presented along with information identifying that the video is synthetically-generated.

FIG. 4 depicts an example user interface 400 in which video 402 is presented along with information identifying that the video 402 is synthetically-generated—namely, (i) a border 404 enclosing the video 402 and having a specific color corresponding to the content-creation attribute of the video 402 and (ii) a pop-up window 406.

In some embodiments, the computing system 100 can cause one or more other computing devices, different from the content-presentation device 202, to perform an action in response to determining the content-creation attribute, such as presenting information identifying the content-creation attribute.

In some cases, the computing system 100 can cause the IoT device 208 and/or the portable computing system 206 located in the viewing environment 200 of the content-presentation device 202 to perform one or more actions. To cause the IoT device 208 and/or the portable computing system 206 to perform the action(s), the computing system 100 can transmit an instruction that, upon receipt by the IoT device 208 and/or the portable computing system 206, causes the IoT device 208 and/or the portable computing system 206 to perform the action(s).

The actions can include, for instance, (i) emitting a color of light selected using mapping data that maps each content-creation attribute of the set of content-creation attributes to a corresponding one of a plurality of distinct colors of light, (ii) playing an audio notification selected using mapping data that maps each content-creation attribute of the set of content-creation attributes to a corresponding one of a plurality of distinct audio notifications (e.g., different sound effects or utterances), and/or (iii) displaying information identifying the content-creation attribute.

For example, the computing system 100 can the IoT device 208 (e.g., a smart lamp) to emit red light when the video is synthetically generated. As another example, the computing system 100 can cause the IoT device 208 (e.g., a smart speaker) and/or the portable computing system 206 (e.g., a smartphone of the user 204) to play an alarm when the video is synthetically generated. As yet another example, the computing system 100 can cause the portable computing system 206 (e.g., a smartphone of the user 204) to display (e.g., on the smartphone's touchscreen) a pop-up notification indicating that the video is synthetically generated. Other examples are possible as well.

In some embodiments, fingerprints of the video can be used as an additional or alternative basis for determining the content-creation attribute of the video. Such fingerprints can be or include one or more fingerprints that each represent a corresponding frame of the video, and/or one or more fingerprints that each represent a corresponding region of a frame of the video. In some cases, the computing system 100 can use fingerprints to determine the content-creation attribute of the video in response to determining that no recognizable watermark is present in the video.

The computing system 100 can obtain the fingerprints in various ways. For example, the metadata in the watermark can include fingerprints of frames of the video. The fingerprints might be hashed and encoded into the watermark, for instance. As another example, when the computing system 100 receives the video, the computing system 100 can generate the fingerprints. As yet another example, the content-distribution system might generate the fingerprints itself and send them to the computing system 100.

In any event, having obtained the fingerprints, the computing system 100 can perform local matching to reference fingerprints or transmit the obtained fingerprints to a remote computing system for the remote computing system to perform the matching. The reference fingerprints can be stored in a local or remote reference database and can include fingerprints of videos having known content-creation attributes. For example, the computing system 100 can generate fingerprints of the video, transmit the fingerprints to a remote computing system that matches the generated fingerprints to reference fingerprints representing a particular synthetically-generated video. The remote computing system can then transmit data to the computing system 100 informing the computing system 100 that the video is synthetically generated.

In some cases, watermarks and/or fingerprints described herein can be timestamped to indicate where in the video a certain content-creation attribute exists. For example a watermark can include metadata indicating synthetically-generated content from a fifteen-minute mark of the video to the thirty-minute mark. In other cases, watermarks and/or fingerprints described herein can include metadata that indicates, or indicate in some other manner, regions (e.g., pixels) of a given frame that has organically-generated content or synthetically-generated content. Thus, watermarks and/or fingerprints can identify the content-creation attribute of any spatial and/or temporal portion of the video.

In some embodiments, the computing system 100 can be configured to determine what percentage of the video has a given content-creation attribute relative to the whole video, and can cause the content-presentation device 202 or other computing system to display or otherwise present that percentage to the user 204 (e.g., 75% of the frames of the video are at least partially synthetically generated).

In some embodiments, the computing system 100 can determine whether to display the video in response to various conditions being met. For example, if the computing system 100 has access to a transcript of the dialogue in a synthetically-generated video, the computing system 100 can compare the transcript to stored lists of respective allowed and disallowed words and phrases and can decide to cause the content-presentation device 202 to display the synthetically-generated video in response to (i) the quantity of allowed words and phrases exceeding a first predefined threshold and/or (ii) the quantity of disallowed words and phrases being below a second predefined threshold.

In some embodiments, the metadata of the watermark can also include a severity level for synthetically-generated video. For example, if the synthetically-generated video was created with the intent to deceive users or has otherwise been tagged as malicious by content distributors or other entities, the metadata can include a value representing a high severity level, which, in combination with the determination that the content-creation attribute designates synthetically-generated video, can cause the computing system 100 to responsively decide not to show the video.

In some embodiments, in response to the computing system 100 determining that the video is synthetically generated, the computing system 100 can perform (or request a server to perform) fingerprint matching or otherwise look up to determine whether the video has a threshold degree of similarity to another existing video, such as an organically-generated video. This can effectively determine whether the video is a synthetic replica of an existing video, such as one intended to deceive users. If the computing system 100 determines there is a threshold degree of similarity, the computing system 100 can transmit a notification to a remote computing system associated with a content creator of the original, organically-generated video, so as to notify them that a fake version of their video exists and is being distributed. Further, in line with this, if fingerprint matching is used to determine, or it is otherwise determined that, the video is doctored, and if the existence of an undoctored video is known, the computing system 100 can cause the content-presentation device 202 or portable computing system 206 to display, along with the content-presentation device's presentation of the video, a selectable link (e.g., a hyperlink) to the undoctored video.

In some embodiments, the computing system 100 can have control settings that the computing system 100 can set by default and that the user 204 can adjust, such as the control setting referred to above that prevents synthetically-generated videos from being displayed by configuring the mapping data to map synthetically-generated video. Other types of control settings are possible as well, to allow and disallow presentation of video having certain content-creation attributes, and each such control setting can be per channel, per user profile, and/or per content-presentation device (e.g., in a household where the computing system 100 controls presentation of content on multiple different content-presentation devices). This provides flexibility for users to set the type of videos they wish to watch.

Figure 5:
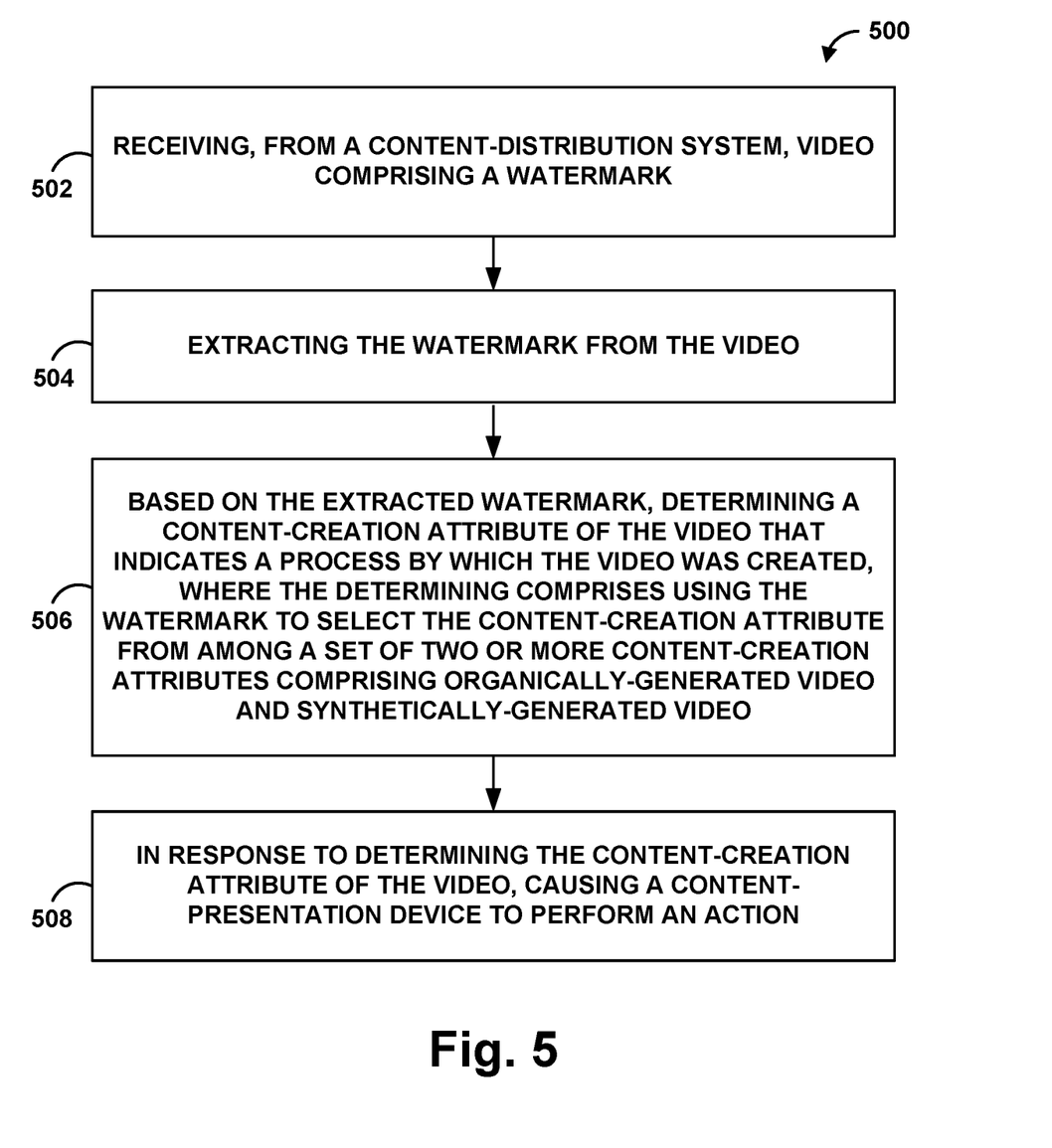
FIG. 5 is a flow chart of an example method.

FIG. 5 is a flow chart illustrating an example method 500. The method 500 can be carried out by the computing system 100. At block 502, the method 500 includes receiving, from a content-distribution system, video comprising a watermark. At block 504, the method 500 includes extracting the watermark from the video. At block 506, the method 500 includes based on the extracted watermark, determining a content-creation attribute of the video that indicates a process by which the video was created, where the determining comprises using the watermark to select the content-creation attribute from among a set of two or more content-creation attributes comprising organically-generated video and synthetically-generated video. At block 508, the method includes in response to determining the content-creation attribute of the video, causing a content-presentation device to perform an action.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A computing system configured for performing a set of acts comprising:
    receiving video comprising a watermark, wherein the watermark includes metadata;
    extracting the watermark from the video;
    based on the metadata of the extracted watermark, determining a content-creation attribute of the video that indicates that the video includes synthetically-generated video; and
    in response to determining the content-creation attribute of the video, causing a device to perform an action.

2. The computing system of claim 1, the set of acts further comprising:
    selecting the action using mapping data that maps the content-creation attribute to a corresponding action.

3. The computing system of claim 1, wherein the action comprises displaying information identifying the content-creation attribute.

4. The computing system of claim 1, wherein the action comprises displaying information identifying the content-creation attribute while presenting the video.

5. The computing system of claim 1, wherein the action comprises displaying information identifying the content-creation attribute before presenting the video.

6. The computing system of claim 5, wherein the information identifying the content-creation attribute comprises a pop-up window.

7. The computing system of claim 5, wherein:
    the information identifying the content-creation attribute comprises a color, and
    the set of acts further comprises selecting the color using mapping data that maps the content-creation attribute to a corresponding distinct color.

8. The computing system of claim 5, wherein:
    the information identifying the content-creation attribute comprises a border enclosing the video and having a color, and
    the set of acts further comprises selecting the color for the border using mapping data that maps the content-creation attribute to a corresponding distinct color.

9. The computing system of claim 1, wherein the action comprises preventing any portion of the video from being displayed.

10. The computing system of claim 6, wherein the pop-up window comprises text identifying the content-creation attribute.

11. The computing system of claim 1, the set of acts further comprising:
    in response to determining the content-creation attribute of the video, causing one or more of an Internet of Things (IoT) device or a portable computing system located in a viewing environment of the device to perform an action.

12. The computing system of claim 11, wherein the action comprises one or more of:
    emitting a color of light selected using mapping data that maps the content-creation attribute to a corresponding distinct color,
    playing an audio notification selected using mapping data that maps the content-creation attribute to a corresponding distinct audio notification, or
    displaying information identifying the content-creation attribute.

13. A method performed by a computing system, the method comprising:
    receiving video comprising a watermark, wherein the watermark includes metadata;
    extracting the watermark from the video;
    based on the metadata of the extracted watermark, determining a content-creation attribute of the video that indicates that the video includes synthetically-generated video; and
    in response to determining the content-creation attribute of the video, causing a device to perform an action.

14. The method of claim 13, further comprising:
    selecting the action using mapping data that maps the content-creation attribute to a corresponding action.

15. The method of claim 13, wherein the action comprises displaying information identifying the content-creation attribute before presenting the video.

16. The method of claim 15, wherein:
    the information identifying the content-creation attribute comprises a color, and
    the method further comprises selecting the color using mapping data that maps the content-creation attribute to a corresponding distinct color.

17. The method of claim 15, wherein:
    the information identifying the content-creation attribute comprises a border enclosing the video and having a color, and
    the method further comprises selecting the color for the border using mapping data that maps the content-creation attribute to a corresponding distinct color.

18. The method of claim 13, wherein the action comprises preventing any portion of the video from being displayed.

19. The method of claim 13, further comprising:
in response to determining the content-creation attribute of the video, causing one or more of an Internet of Things (IoT) device or a portable computing system located in a viewing environment of a content-presentation device to perform an action,
wherein the action comprises one or more of:
emitting a color of light selected using mapping data that maps the content-creation attribute to a corresponding distinct color,
playing an audio notification selected using mapping data that maps the content-creation attribute to a corresponding distinct audio notification, or
displaying information identifying the content-creation attribute.

20. A non-transitory computer-readable medium having stored thereon program instructions that upon execution by a computing system, cause performance of a set of acts comprising:
receiving video comprising a watermark, wherein the watermark includes metadata;
extracting the watermark from the video;
based on the metadata of the extracted watermark, determining a content-creation attribute of the video that indicates that the video includes synthetically-generated video; and
in response to determining the content-creation attribute of the video, causing a device to perform an action.

\* \* \* \* \*